US008149282B2

(12) United States Patent
Lee et al.

(10) Patent No.: US 8,149,282 B2
(45) Date of Patent: Apr. 3, 2012

(54) HAND SHAKE CORRECTION APPARATUS AND DIGITAL PHOTOGRAPHING APPARATUS INCLUDING THE SAME

(75) Inventors: Kyung-bae Lee, Suwon-si (KR); Kwang-seok Byon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 12/468,272

(22) Filed: May 19, 2009

(65) Prior Publication Data

US 2009/0295929 A1 Dec. 3, 2009

(30) Foreign Application Priority Data

May 30, 2008 (KR) ........................ 10-2008-0051067

(51) Int. Cl.
*H04N 5/228* (2006.01)

(52) U.S. Cl. .................................................. 348/208.11

(58) Field of Classification Search .................. 359/823, 359/824, 813, 814; 396/55; 348/208.11, 348/208.99, 208.4, 208.5, 208.7, 340
See application file for complete search history.

(56) References Cited

U.S. PATENT DOCUMENTS 5,822,623 A 10/1998 Urata et al.
5,835,799 A 11/1998 Washisu
5,883,742 A 3/1999 Kamata
6,631,042 B2 10/2003 Noguchi
8,049,782 B2 * 11/2011 Noji ......................... 348/208.11
2006/0165397 A1 7/2006 Uehara et al.
2007/0009244 A1 1/2007 Takahashi
2008/0187301 A1 * 8/2008 Takahashi ....................... 396/55
2009/0201381 A1 * 8/2009 Byon et al. ............... 348/208.11
2009/0219402 A1 * 9/2009 Schneider .................. 348/208.7
2009/0252488 A1 * 10/2009 Eromaki et al. .............. 359/824

FOREIGN PATENT DOCUMENTS

JP 2000-194027 A 7/2000
JP 2004-101721 A 4/2004

* cited by examiner

*Primary Examiner* — Jason Whipkey

(74) *Attorney, Agent, or Firm* — Drinker Biddle & Reath LLP

(57) ABSTRACT

A hand shake correction apparatus and a digital photographing apparatus including the hand shake correction apparatus are provided. The hand shake correction apparatus includes: a correction lens module including a correction lens and a correction lens supporting plate; a base movably supporting the supporting plate; first and second driving units moving the supporting plate; and third and fourth driving units moving the supporting plate. The first and second driving units are arranged such that a driving force action line applied to the supporting plate by the first and second driving units passes through a center of mass of the correction lens module. The third and fourth driving units are arranged such that a driving force action line applied to the supporting plate by the third and fourth driving units passes through a center of mass of the correction lens module.

13 Claims, 8 Drawing Sheets

HAND SHAKE CORRECTION APPARATUS AND DIGITAL PHOTOGRAPHING APPARATUS INCLUDING THE SAME

CROSS-REFERENCE TO RELATED PATENT APPLICATION

This application claims the benefit of Korean Patent Application No. 10-2008-0051067, filed on May 30, 2008 in the Korean Intellectual Property Office, the entire contents of which is incorporated herein by reference.

BACKGROUND OF THE INVENTION

1. Field of the Invention

The present invention relates to a hand shake correction apparatus and a digital image photographing apparatus including the same. More particularly, the present invention relates to a hand shake correction apparatus that reduces image blurring caused by a user's hand shaking when photographing an image using a digital photographing device, and a digital photographing apparatus including the hand shake correction apparatus.

2. Description of the Related Art

Generally, a digital photographing apparatus is an apparatus that generates and/or stores digital files of still or moving images. Examples of such a digital photographing apparatus include a digital still camera (DSC), a digital video camera (DVC), digital cameras installed in mobile phones, and the like.

Because a large number of such digital photographing apparatuses are in use in current times, consumers are increasingly demanding products that provide high quality still images and/or moving images. As a result, demands are increasing for digital photographing apparatuses that include a hand shake correction apparatus for preventing decrease in clarity of images which may be caused due to a user's hand shaking while using the digital photographing apparatus. A conventional hand shake correction apparatus performs a hand shake correction function by moving a hand shake correction lens or an imaging device. FIG. 1 is a view illustrating an example of a portion of a conventional hand shake correction apparatus which performs a hand shake prevention functionality by moving a hand shake correction lens.

Referring to FIG. 1, the conventional hand shake correction apparatus includes a correction lens supporting plate 13 supporting a correction lens (not shown), and a base 20 supporting the correction lens supporting plate 13 to be movable along a plane. In FIG. 1, a correction lens (not shown) is inserted into an opening portion of the correction lens supporting plate 13. In order to move the correction lens supporting plate 13 with respect to the base 20, a first driving unit 31 moving the correction lens supporting plate 13 in a first direction and a second driving unit 32 moving the correction lens supporting plate 13 in a second direction are disposed on the correction lens supporting plate 13. Also, a first detecting unit 41 and a second detecting unit 42, which are disposed on the correction lens supporting plate 13, detect how much the correction lens and/or the correction lens supporting plate 13 are moved with respect to the base 20.

When the conventional hand shake correction apparatus is installed in a digital photographing apparatus, the base 20 is installed in a body of the digital photographing apparatus, and even when the base 20 of the hand shake correction apparatus is shaken due to the body of the digital photographing apparatus being shaken due to hand shake, etc., the correction lens supporting plate 13 is moved relative to the base 20 together with the correction lens, and consequently, light that has passed through other lens portions including the correction lens is incident on predetermined portions of the imaging device despite the shaking of the digital photographing apparatus. Accordingly, a clear still or moving image without blur can be obtained.

The conventional hand shake correction apparatus illustrated in FIG. 1 is a shutter integrated hand shake correction apparatus in which a shutter 51 and a shutter driving unit 53 are integrally formed in the hand shake correction apparatus. Accordingly, in order to arrange the shutter 51 and the shutter driving unit 53, the shape of the correction lens supporting plate 13 is not symmetric about a crossing point COA of the correction lens and the optical axis passing through the correction lens, which can be regarded as the center of the hand shake correction apparatus, as illustrated in FIG. 1. As a result, a center of mass CM of a correction lens module including the correction lens and the correction lens supporting plate 13 is deviated from the optical axis passing through the crossing point COA of the correction lens and the optical axis passing through the correction lens. Accordingly, a center of force CF, which is the crossing point of a driving force action line $F_V$ of the first driving unit 31 moving the correction lens supporting plate 13 in a first direction and a driving force action line $F_H$ of the second driving unit 32 moving the correction lens supporting plate 13 in a second direction, does not correspond to the center of mass CM of the correction lens module. Thus, torque is generated when the correction lens module is moved by the first driving unit 31 and the second driving unit 32. As undesired torque is generated as described above when the hand shake correction apparatus is being operated, the hand shake prevention function of the hand shake correction apparatus is degraded.

Further, as illustrated in FIG. 1, the center of force CF, which is the crossing point of the driving force action line $F_V$ of the first driving unit 31 and the driving force action line $F_H$ of the second driving unit 32, does not correspond to the crossing point COA of the correction lens and the optical axis passing through the correction lens, either, which can be regarded as the center of the hand shake correction apparatus. Accordingly, in FIG. 2, which is a view illustrating an example of a portion of another conventional hand shake correction apparatus, the positions of the first driving unit 31 and the first detecting unit 41 are switched, and the positions of the second driving unit 32 and the second detecting unit 42 are switched in order that the center of force CF, which is the crossing point of the driving force action line $F_V$ of the first driving unit 31 and the driving force action line $F_H$ of the second driving unit 32, coincides with the crossing point COA of the correction lens and the optical axis passing through the correction lens, which can be regarded as the center of the hand shake correction apparatus.

However, although the first and second driving units 31 and 32 are illustrated to be small for convenience of illustration in FIGS. 1 and 2, the actual size of the first and second driving units 31 and 32 is large, and thus it is not easy to arrange them as illustrated in FIG. 2. Furthermore, as illustrated in FIG. 2, since the first detecting unit 41 and/or the second detecting unit 42 are disposed to be more adjacent to the shutter driving unit 53 than they are in FIG. 1, they may be affected by the shutter driving unit 53 and thus the movement of the correction lens supporting plate 13 may not be accurately detected.

SUMMARY OF THE INVENTION

The present invention provides a hand shake correction apparatus that reduces an undesired effect caused by a user's hand shaking when photographing an image using a digital photographing apparatus. The present invention also provides a digital photographing apparatus including the hand shake correction apparatus.

According to an embodiment of the present invention, a hand shake correction apparatus is provided. The hand shake correction apparatus includes: a correction lens module comprising a correction lens and a correction lens supporting plate supporting the correction lens; a base movably supporting the correction lens supporting plate along a first axis that is perpendicular to an optical axis of the correction lens and along a second axis that is perpendicular to the optical axis and the first axis; first and second driving units moving the correction lens supporting plate such that the correction lens supporting plate can be moved along the first axis; and third and fourth driving units moving the correction lens supporting plate such that the correction lens supporting plate can be moved along the second axis, wherein the first and second driving units are arranged such that a driving force action line applied to the correction lens supporting plate by the first and second driving units passes through a center of mass of the correction lens module, and the third and fourth driving units are arranged such that a driving force action line applied to the correction lens supporting plate by the third and fourth driving units passes through a center of mass of the correction lens module.

The center of mass of the correction lens module may be positioned along the optical axis of the correction lens.

The driving force action line applied to the correction lens supporting plate by the first driving unit and the driving force action line applied to the correction lens supporting plate by the second driving unit may be parallel to the first axis, respectively.

The driving force action line applied to the correction lens supporting plate by the third driving unit and the driving force action line applied to the correction lens supporting plate by the fourth driving unit may be parallel to the second axis, respectively.

The correction lens module may further include a magnet disposed on the correction lens supporting plate, and the first through fourth driving units may comprise coils disposed on the base.

The hand shake correction apparatus may further include a yoke disposed on the base to face the magnet, with the correction lens supporting plate interposed between the yoke and the base, and the correction lens module may be closely adhered to the base by attraction between the magnet and the yoke.

The first driving unit and the third driving unit may be disposed on a first side of the correction lens, and the second driving unit and the fourth driving unit may be disposed on a second side of the correction lens.

The hand shake correction apparatus may further include a cover coupled to the base to cover the correction lens module, wherein the cover comprises a first detecting unit detecting motion of the correction lens supporting plate along the first axis and a second detecting unit detecting motion of the correction lens supporting plate along the second axis.

Each of the first and second detecting units may include a hall sensor.

The first driving unit and the third driving unit may be disposed on a first side of the correction lens, and the second driving unit and the fourth driving unit may be disposed on a second side of the correction lens, and the first detecting unit may be disposed on the first side and the second detecting unit may be disposed on the second side of the correction lens, or the first detecting unit may be disposed on the second side and the second detecting unit may be disposed on the first side of the correction lens.

The hand shake correction apparatus may further include: a shutter capable of shielding light incident on the correction lens; and a shutter driving unit moving the shutter to shield light incident on the correction lens, wherein the shutter driving unit is disposed such that the positions of the first detecting unit and the second detecting unit are not overlapped when viewed along the optical axis.

According to another embodiment of the present invention, a digital image processing apparatus is provided that includes the above-described hand shake correction apparatus.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
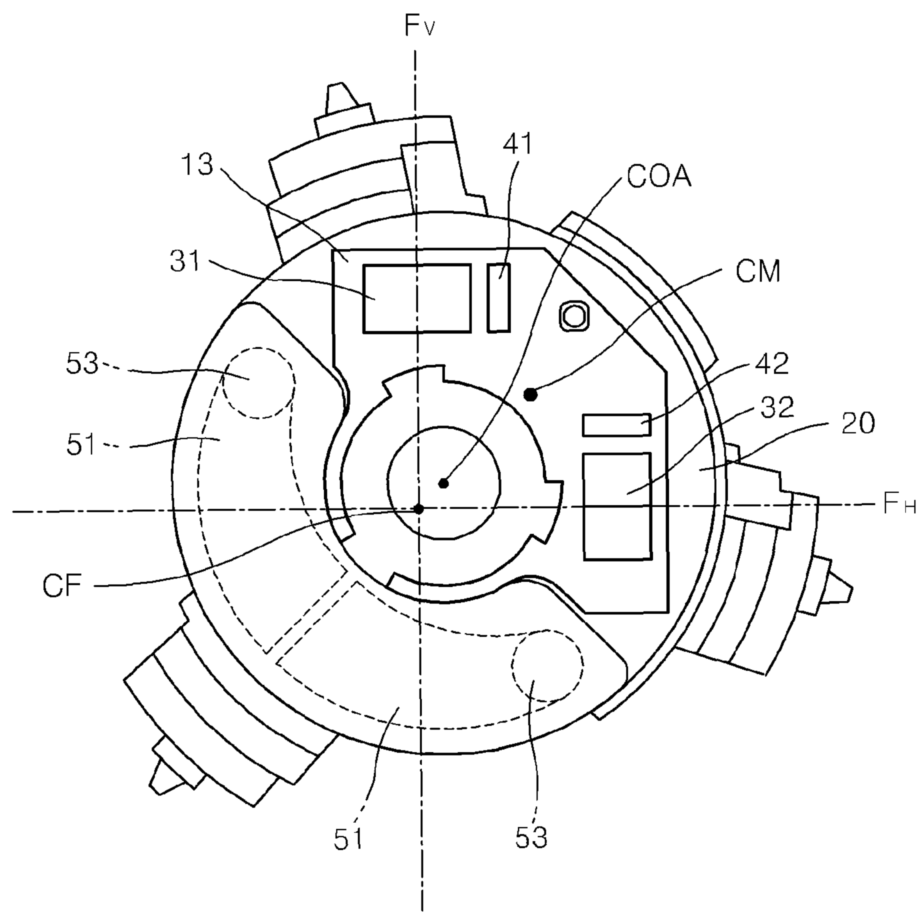
FIG. 1 is a view illustrating an example of a portion of a conventional hand shake correction apparatus.
Figure 2:
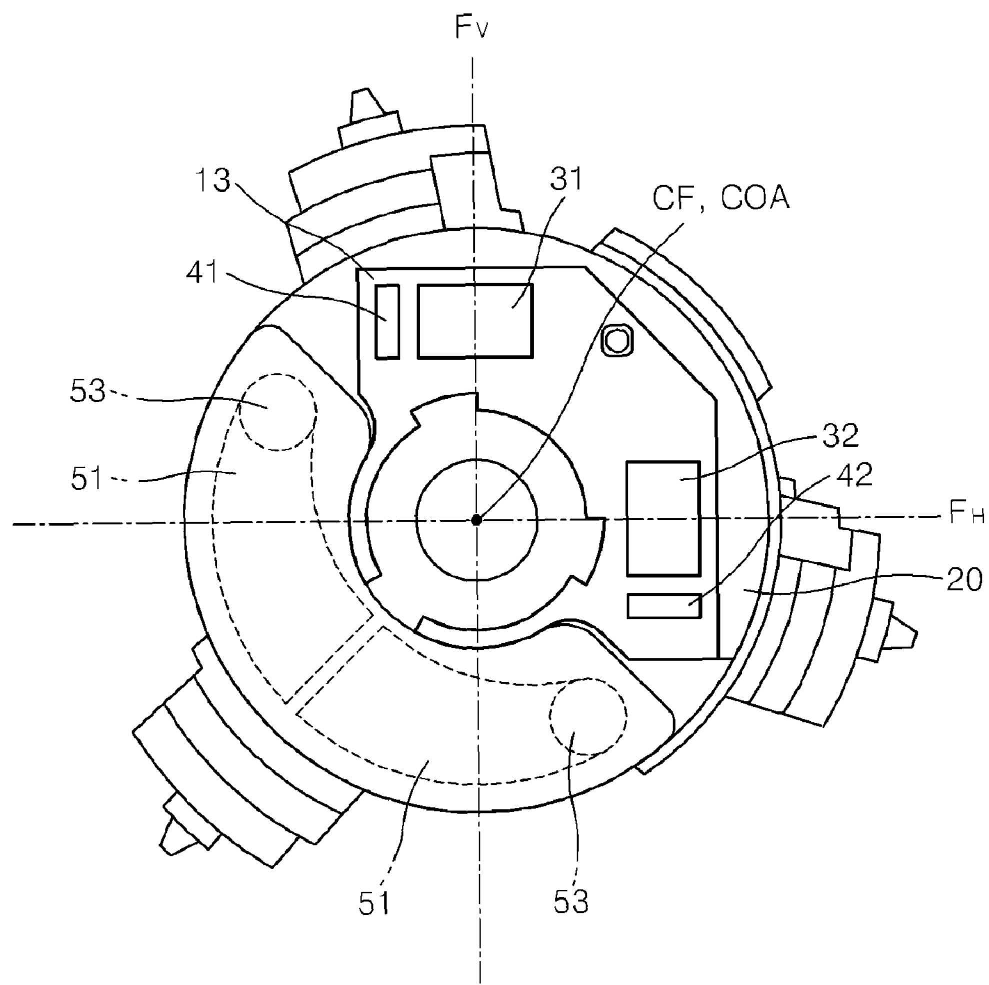
FIG. 2 is a view illustrating an example of a portion of another conventional hand shake correction apparatus.
Figure 3:
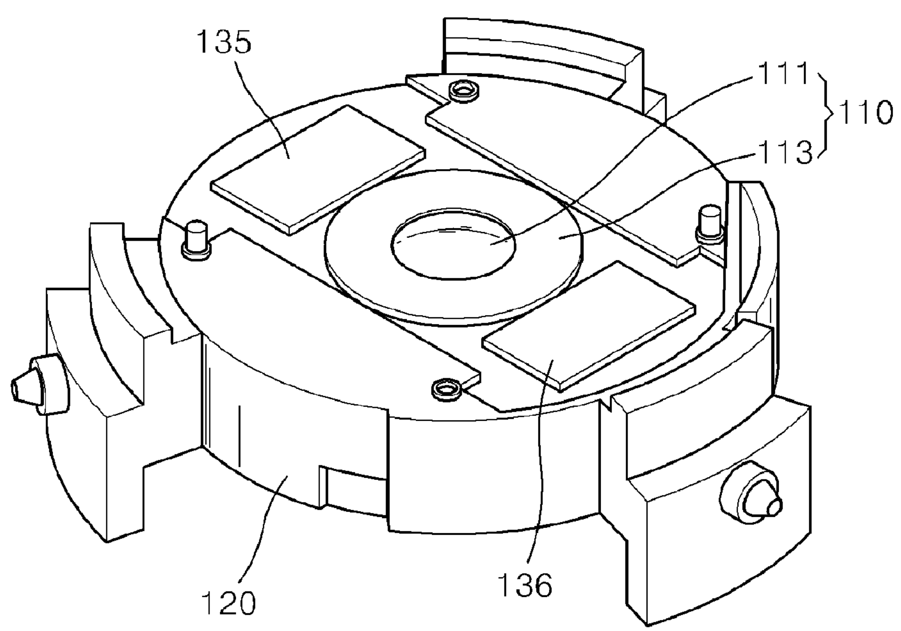
FIG. 3 is a perspective view illustrating an example of a portion of a hand shake correction apparatus according to an embodiment of the present invention.
Figure 3:
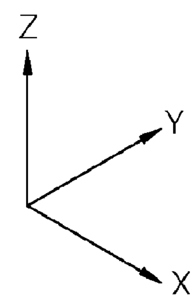
Figure 4A:
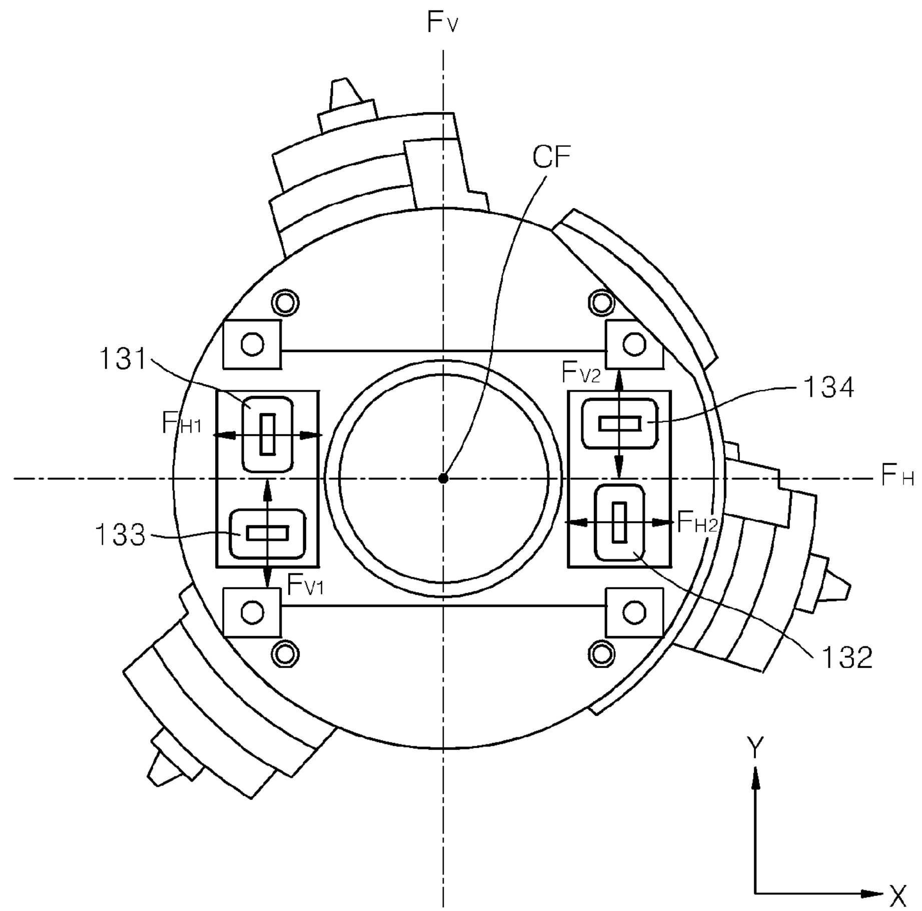
FIGS. 4A and 4B are views illustrating examples of portions of the hand shake correction apparatus of FIG. 3, according to an embodiment of the present invention.
Figure 4B:
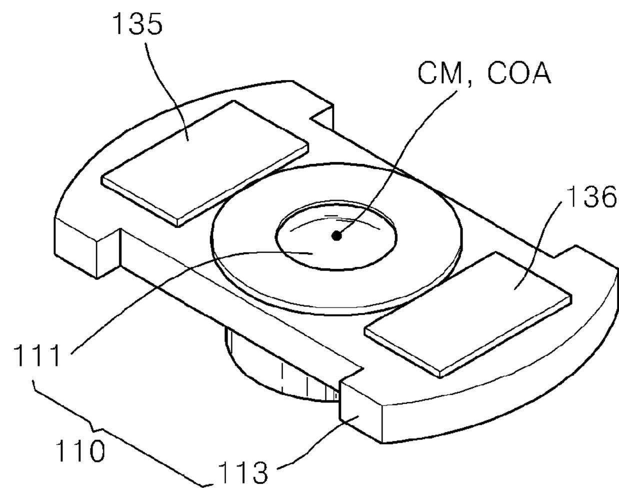
Figure 5:
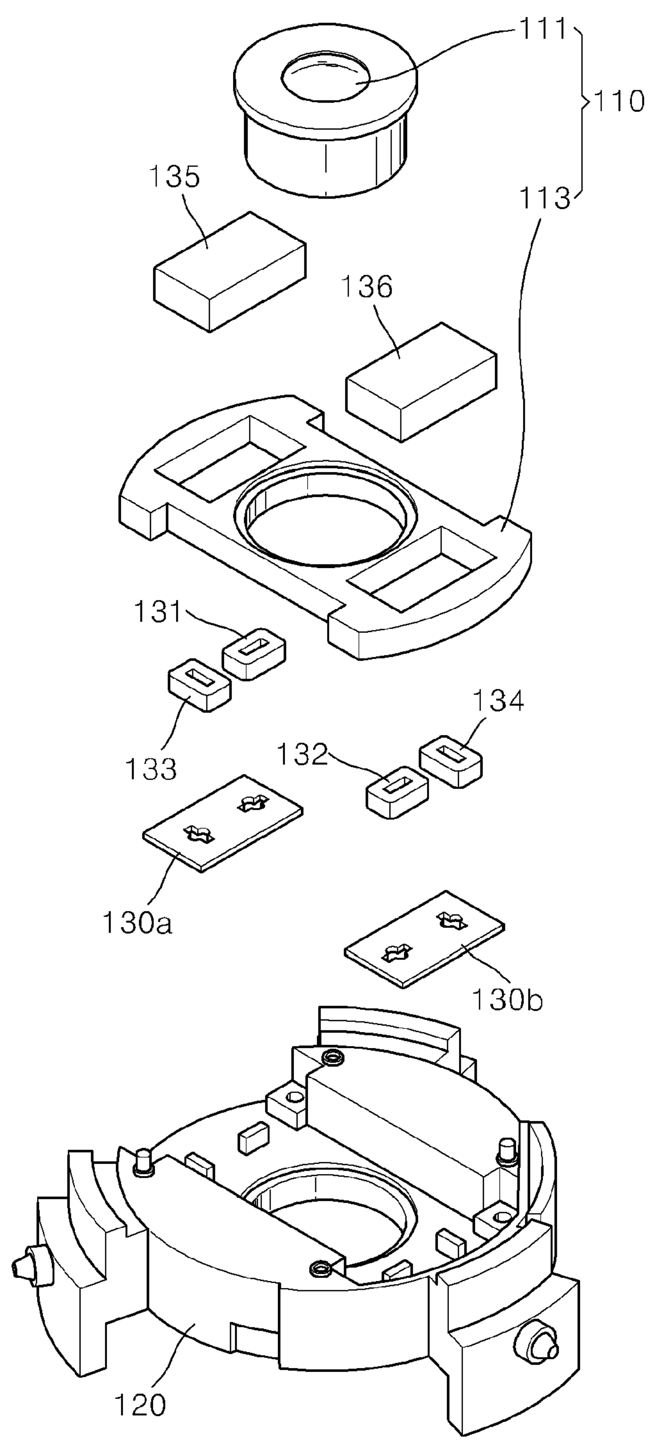
FIG. 5 is an exploded perspective view illustrating an example of the hand shake correction apparatus of FIG. 3, according to an embodiment of the present invention.

FIG. 3 is a perspective view illustrating an example of a portion of a hand shake correction apparatus according to an embodiment of the present invention. FIG. 4A is a view illustrating an example of a portion of the hand shake correction apparatus of FIG. 3 from which a correction lens module 110 is removed according to an embodiment of the present invention. FIG. 4B is a perspective view illustrating an example of the correction lens module 110 of FIG. 3 according to an embodiment of the present invention. FIG. 5 is an exploded perspective view illustrating an example of the hand shake correction apparatus of FIG. 3 according to an embodiment of the present invention.

Referring to the examples of FIGS. 3, 4A, 4B, and 5, the hand shake correction apparatus according to the current embodiment of the present invention includes a correction lens module 110, a base 120, a first driving unit 131, a second driving unit 132, a third driving unit 133, and a fourth driving unit 134. The correction lens module 110 includes a correction lens 111 and a correction lens supporting plate 113 supporting the correction lens 111. The correction lens module 110 is symmetrical about its geometrical center point vertically and horizontally, so that a center of mass CM is positioned at the geometrical center point of the correction lens module 110.

The base 120 supports the correction lens supporting plate 113 to be movable along a first axis (x-axis) that is perpendicular to an optical axis (z-axis) and a second axis (y-axis) that is perpendicular to the first axis. Consequently, the base 120 movably supports the correction lens module 110 which includes the correction lens supporting plate 113. Thus, when movement occurs due to hand shaking, etc. and thus images obtained from data in an imaging device (not shown) may not be clear, the correction lens module 110 is moved to correct hand shake so that images from data obtained from the imaging device can be clear.

As described above, the correction lens module 110, more particularly, the correction lens supporting plate 113, can be moved with respect to the base 120 by first through fourth driving units 131 through 134. That is, the first and second driving units 131 and 132 move the correction lens supporting plate 113 along the first axis (x-axis). The third and fourth driving units 133 and 134 move the correction lens supporting plate 113 along the second axis (y-axis).

The first driving unit 131 and the second driving unit 132 are finally disposed such that a driving force action line $F_H$ applied to the correction lens supporting plate 113 by the first driving unit 131 and the second driving unit 132 passes through the center of mass CM of the correction lens module 110 by a driving force action line $F_{H1}$ applied to the correction lens supporting plate 113 by the first driving unit 131 and a driving force action line $F_{H2}$ applied to the correction lens supporting plate 113 by the second driving unit 132. Also, the third driving unit 133 and the fourth driving unit 134 are finally disposed such that a driving force action line $F_V$ applied to the correction lens supporting plate 113 by the first driving unit 131 and the second driving unit 132 passes through the center of mass CM of the correction lens module 110 by a driving force action line $F_{V1}$ applied to the correction lens supporting plate 113 by the first driving unit 131 and a driving force action line $F_{V2}$ applied to the correction lens supporting plate 113 by the second driving unit 132. Accordingly, the center of force CF, which is the crossing point of the driving force actions lines $F_H$ and $F_V$ applied to the correction lens supporting plate 113 by the first through fourth driving units 131 through 134, passes through the center of mass CM of the correction lens module 110. As illustrated in the examples of FIGS. 3 through 5, the center of mass CM of the correction lens module 110 may be positioned on the optical axis of the correction lens 111. That is, the crossing point COA of the correction lens 111 and the optical axis of the correction lens 111 may be designed to correspond to the center of mass CM of the correction lens module 110.

As described above, in the case of a conventional hand shake correction apparatus, the center of force, which is the crossing point of driving force action lines of the driving units that move the correction lens supporting plate, does not correspond to the center of mass of the correction lens module, and thus torque is necessarily generated when the correction lens module is moved by the driving units, and accordingly, the hand shake prevention function of the hand shake correction apparatus is degraded. However, in the hand shake correction apparatus according to the current embodiment of the present invention, the center of force CF, which is the crossing point of the driving force action lines applied to the correction lens supporting plate 113 by the first through fourth driving units 131 through 134, passes through the center of mass CM of the correction lens module 110, as described above. Accordingly, torque generated while the hand shake correction apparatus is being operated can be significantly reduced, and thus the degradation of the hand shake prevention function due to the operation of the hand shake correction apparatus can be substantially reduced.

Meanwhile, in order that the driving force action line $F_H$ applied to the correction lens supporting plate 113 by the first driving unit 131 and the second driving unit 132 finally passes through the center of mass CM of the correction lens module 110 by the driving force action line $F_{H1}$ applied to the correction lens supporting plate 113 by the first driving unit 131 and the driving force action line $F_{H2}$ applied to the correction lens supporting plate 113 by the second driving unit 132, the driving force action line $F_{H1}$ applied to the correction lens supporting plate 113 by the first driving unit 131 and the driving force action line $F_{H2}$ applied to the correction lens supporting plate 113 by the second driving unit 132 may be arranged to be parallel to the first axis (x-axis).

In this case, the driving force action line $F_{H1}$ applied to the correction lens supporting plate 113 by the first driving unit 131 and the driving force action line $F_{H2}$ applied to the correction lens supporting plate 113 by the second driving unit 132 may be obviously arranged not only to be parallel to the first axis (x-axis) but to coincide with the first axis (x-axis), which means that driving force starting points of the driving force action line $F_{H1}$ applied to the correction lens supporting plate 113 by the first driving unit 131 and the driving force action line $F_{H2}$ applied to the correction lens supporting plate 113 are positioned on the first axis (x-axis). However, in order to arrange the third driving unit 133 and the fourth driving unit 134, the driving force action line $F_{H1}$ applied to the correction lens supporting plate 113 by the first driving unit 131 and the driving force action line $F_{H2}$ applied to the correction lens supporting plate 113 may not coincide with the first axis (x-axis), as illustrated in the example of FIG. 4A.

Accordingly, in this case, as illustrated in the example of FIG. 4A, the first driving unit 131 is formed on a first side of the first axis (e.g., a line along the driving force action line $F_H$), and the second driving unit 132 is arranged on a second side of the first axis, so that the driving force action line $F_H$ applied to the correction lens supporting plate 113 by the first driving unit 131 and the second driving unit 132 finally passes through the center of mass CM of the correction lens module 110 by the driving force action line $F_{H1}$ applied to the correction lens supporting plate 113 by the first driving unit 131 and the driving force action line $F_{H2}$ applied to the correction lens supporting plate 113 by the second driving unit 132.

Also, as described above, in order that the driving force action line $F_V$ applied to the correction lens supporting plate 113 by the third driving unit 133 and the fourth driving unit 134 finally passes through the center of mass CM of the correction lens module 110 by the driving force action line $F_{V1}$ applied to the correction lens supporting plate 113 by the third driving unit 133 and the driving force action line $F_{V2}$ applied to the correction lens supporting plate 113 by the fourth driving unit 134, the driving force action line $F_{V1}$ applied to the correction lens supporting plate 113 by the third driving unit 133 and the driving force action line $F_{V2}$ applied to the correction lens supporting plate 113 by the fourth driving unit 134 may be arranged to be parallel to the second axis (y-axis).

In this case, the driving force action line $F_{V1}$ applied to the correction lens supporting plate 113 by the third driving unit 133 and the driving force action line $F_{V2}$ applied to the correction lens supporting plate 113 by the fourth driving unit 134 may obviously be arranged not only to be parallel to the second axis (y-axis) but to coincide with the second axis (y-axis), which means that driving force starting points of the driving force action line $F_{V1}$ applied to the correction lens supporting plate 113 by the third driving unit 133 and the driving force action line $F_{V2}$ applied to the correction lens supporting plate 113 are positioned on the second axis (y-axis). However, in order to arrange the third driving unit 133 and the fourth driving unit 134, the driving force action line $F_{V1}$ applied to the correction lens supporting plate 113 by the third driving unit 133 and the driving force action line $F_{V2}$ acting on the correction lens supporting plate 113 may not coincide with the second axis (y-axis), as illustrated in FIG. 4A.

Accordingly, in this case, as illustrated in FIG. 4A, the third driving unit 133 is formed on a first side of the second axis (y-axis), and the fourth driving unit 134 is arranged on a second side of the second axis (y-axis), so that the driving force action line $F_V$ applied to the correction lens supporting plate 113 by the third driving unit 133 and the fourth driving unit 134 finally passes through the center of mass CM of the correction lens module 110 by the driving force action line $F_{V1}$ applied to the correction lens supporting plate 113 by the third driving unit 133 and the driving force action line $F_{V2}$ applied to the correction lens supporting plate 113 by the fourth driving unit 134.

Meanwhile, the first through fourth driving units 131 through 134 may be realized in various manners. For example, the first through fourth driving units 131 through 134 each may be coils arranged on the base 120. In this case, the correction lens module 110 may include magnets 135 and 136 disposed on the correction lens supporting plate 113 as illustrated in the examples of FIGS. 3 through 5. In such a configuration, the amplitude of current supplied to the first through fourth driving units 131 through 134, which are coils, is controlled so that a desired attraction and/or repulsion is generated between the first through fourth driving units 131 through 134 and the magnets 135 and 136, thereby moving the correction lens module 110 by the first through fourth driving units 131 through 134.

In this regard, the number of magnets may be two, instead of four like the number of the four first through fourth driving units 131 through 134. In other words, the first driving unit 131 and the third driving unit 133 may be disposed to correspond to one magnet 135, and the second driving unit 132 and the fourth driving unit 134 may be disposed to correspond to the other magnet 136, thereby simplifying the configuration of the hand shake correction apparatus. In this case, as illustrated in FIGS. 3 through 5, the first driving unit 131 and the third driving unit 133 are disposed on a first side of the correction lens 111, and the second driving unit 132 and the fourth driving unit 134 are disposed on a second side of the correction lens 111.

Meanwhile, the correction lens module 110 needs to be closely adhered to the base 120. In the conventional art, a spring is used for this purpose. However, when a spring is used, the correction lens module 110 may not be closely adhered to the base 120 due to the reduction in elasticity of the spring over time. Thus, in order to prevent such problem, yokes 130*a* and 130*b* may be included in the hand shake correction apparatus according to the current embodiment of the present invention. The yokes 130*a* and 130*b* are disposed on a first side of the correction lens supporting plate 113 such that attraction is generated between the correction lens supporting plate 113 and the magnets 135 and 136 disposed on a second side of the correction lens supporting plate 113. Accordingly, when the yokes 130*a* and 130*b* are attached to the base 120, the correction lens module 110 can be closely adhered to the base in a natural way. Particularly, since the magnets 135 and 136 need to be included so as to move the correction lens module 110 as described above, the correction lens module 110 can be efficiently adhered to the base 120 using attraction generated between the magnets 135 and 136 and the yokes 130*a* and 130*b* simply by adding the yokes 130*a* and 130*b*.

Furthermore, if the correction lens module 110 is moved due to the shaking caused by external shock, and so forth, the correction lens module 110 can be returned to its original position by the attraction generated between the magnets 135 and 136 and the yokes 130*a* and 130*b* on the correction lens supporting plate 113. Also, as well as centering the position of the correction lens module 110 by applying a current to the first through fourth driving units 131 through 134, power consumption can also be significantly reduced by using attraction between the yokes 130*a* and 130*b* and the magnets 135 and 136.

Figure 6:
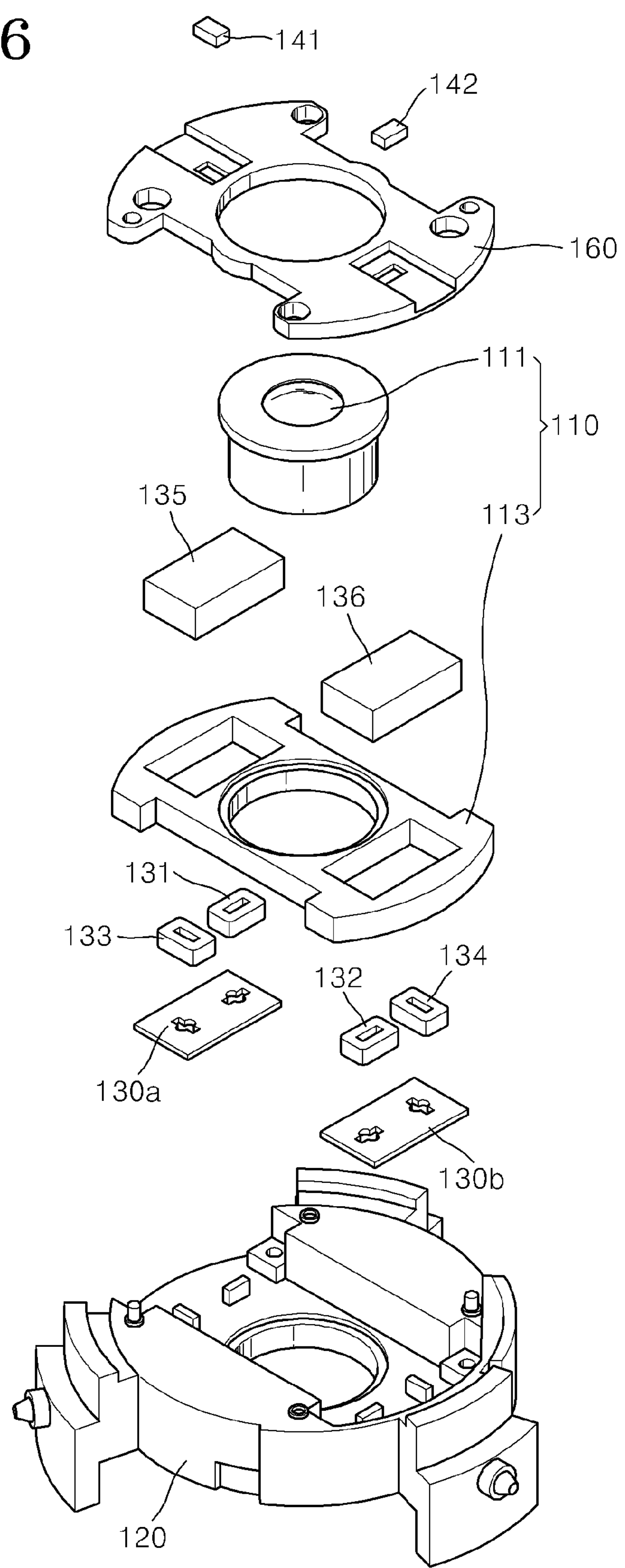
FIG. 6 is an exploded perspective view illustrating an example of a hand shake correction apparatus according to another embodiment of the present invention.

FIG. 6 is an exploded perspective view illustrating an example of a hand shake correction apparatus according to another embodiment of the present invention. The hand shake correction apparatus of the example of FIG. 6 is different from that of the previous embodiment in that a cover 160 that is coupled to the base 120 and covers the correction lens module 110 is further included. A first detecting unit 141 detecting motion of the correction lens supporting plate 113 along a first axis (x-axis) and a second detecting unit 142 detecting motion of the correction lens supporting plate 113 along a second axis (y-axis) are disposed on the cover 160. Each of the first and second detecting units 141 and 142 may include a hall sensor that detects motion and/or position of the correction lens supporting plate 113 using the principle that a current and/or voltage that is induced according to the intensity of a magnetic field changes. However, the first detecting unit 141 and the second detecting unit 142 included in the hand shake correction apparatus according to the current embodiment of the present invention are not limited to the above, and may have other structures.

When the first detecting unit 141 and the second detecting unit 142 include hall sensors, magnets corresponding thereto are needed. As described above, since the magnets 135 and 136 may be included in the correction lens module 110 for the operation of the first through fourth driving units 131 through 134 for moving the correction lens supporting plate 113, the first detecting unit 141 and the second detecting unit 142 may detect motion of the correction lens supporting plate 113 using the magnets 135 and 136. Thus, no additional magnet is needed, and thus the configuration of the hand shake correction apparatus can be simplified. In this case, the first driving unit 131 and the third driving unit 133 are formed on a first side of the correction lens 111, and the second driving unit 132 and the fourth driving unit 134 are formed on a second side of the correction lens 111, and the first detecting unit 141 may be disposed on the first side, and the second detecting unit 142 may be disposed on the second side. Alternatively, the first detecting unit 141 may also be disposed on the second side, and the second detecting unit 142 may be disposed on the first side.

Figure 7:
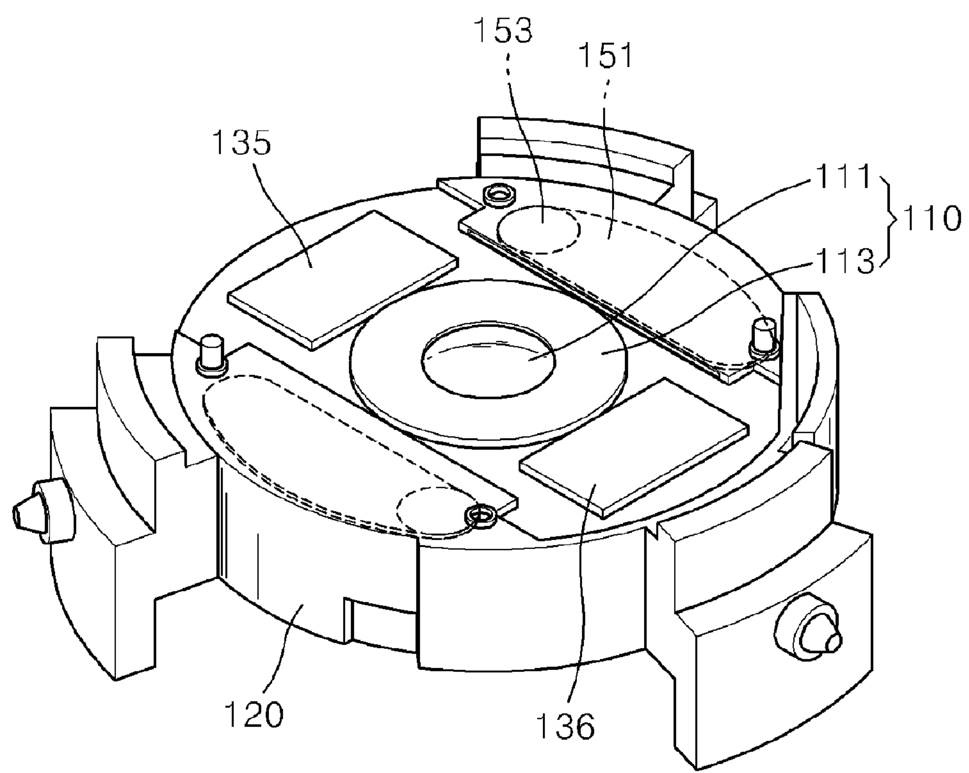
FIG. 7 is a perspective view illustrating an example of a hand shake correction apparatus according to another embodiment of the present invention.

FIG. 7 is a perspective view illustrating an example of a hand shake correction apparatus according to another embodiment of the present invention. The hand shake correction apparatus of the example of FIG. 7 is a shutter integrated hand shake correction apparatus in which a shutter 151 capable of shielding light incident on the correction lens 111 and a shutter driving unit 153 capable of moving the shutter 151 to shield light incident on the correction lens 111 are integrally formed as one unit. That is, as the shutter 151 is moved by the shutter driving unit 153 and thus positioned near the correction lens 111, light can be blocked from passing through the correction lens 111. In FIG. 7, there are two shutters 151 and two shutter driving units 153, but the present invention is not limited thereto. Alternatively, for example, one shutter 151 and one shutter driving unit 153 may be disposed on a first side of the correction lens supporting plate 113, and an ND filter and an ND filter driving unit may be disposed on a second side of the correction lens supporting plate 113.

In the hand shake correction apparatus according to the current embodiment of the present invention, the shutter driving unit 153 is disposed such that a first detecting unit (not shown) and a second detecting unit (not shown) do not overlap with each other along the optical axis. As described above about first through fourth driving units (not shown), the shutter driving unit 153 may include coils and control current flowing through the coils, thereby generating force to move the shutter 151 by interaction between the coil and the magnets that are disposed adjacent to the coil. Meanwhile, the first detecting unit and the second detecting unit may include hall sensors detecting motion and/or position of the correction lens supporting plate 113 using the principle that a current and/or voltage induced according to the intensity of a magnetic field changes. When the shutter driving unit 153 is disposed to be adjacent to the first detecting unit and/or the second detecting unit, the first detecting unit and/or the second detecting unit may malfunction. However, in the hand shake correction apparatus according to the current embodiment of the present invention, the shutter driving unit 153 is disposed not to overlap with the first detecting unit (not shown) and the second detecting unit (not shown) along the optical axis, and the malfunction of the first detecting unit and the second detecting unit can be efficiently prevented.

Figure 8:
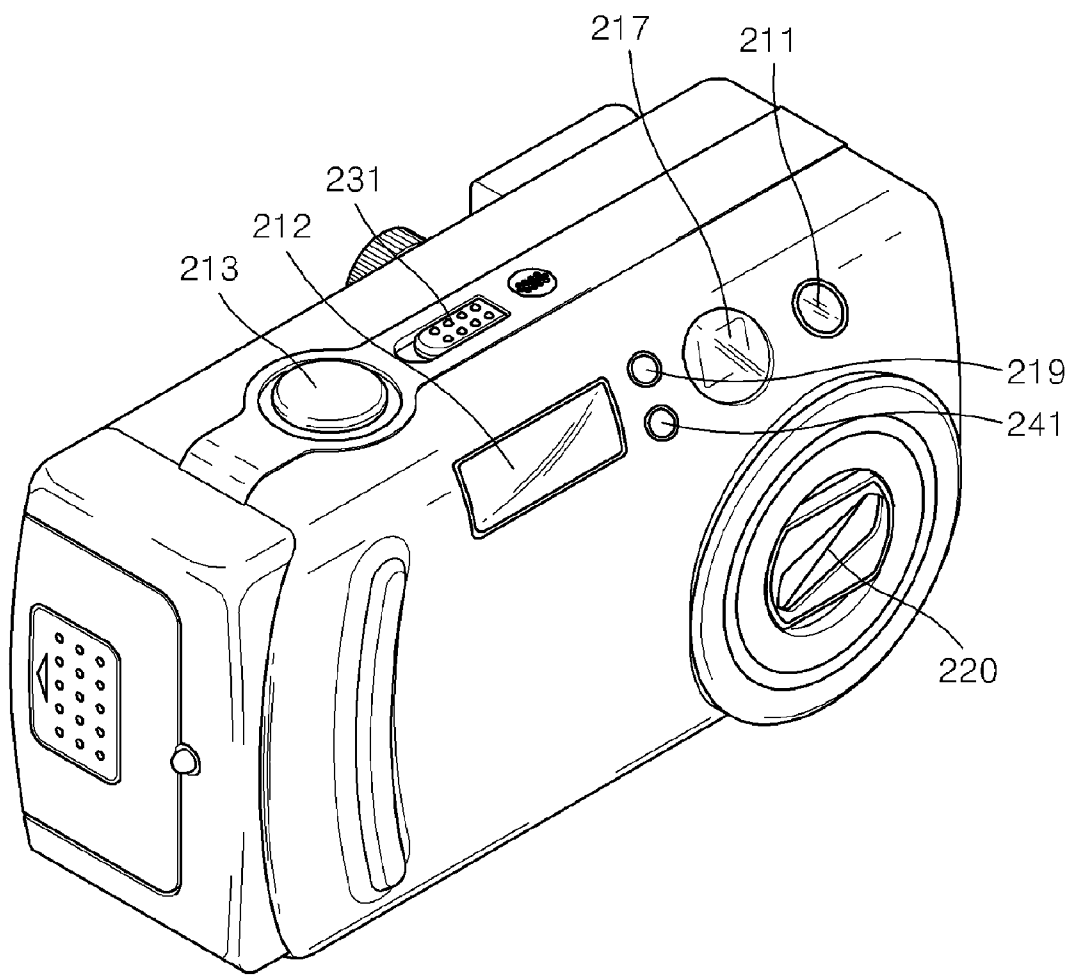
FIG. 8 is a perspective view illustrating an example of a digital photographing apparatus according to an embodiment of the present invention.

FIG. 8 is a perspective view illustrating an example of a digital photographing apparatus according to an embodiment of the present invention. Referring to the example of FIG. 8, the digital photographing apparatus according to the current embodiment of the present invention includes a self-timer lamp 211, a flash 212, a shutter release button 213, a view finder 217, a flash-light amount sensor 219, a power switch 231, a lens unit 220, and a remote receiving unit 241.

In a self-timer mode, the self-timer lamp 211 is operated during a set up time from a time point at which the shutter release button 213 is pushed to a time point at which an image is captured. The flash-light amount sensor 219 senses the light amount when the flash 212 is being operated and inputs the light amount to a digital camera processor (not shown) via a microcontroller (not shown). The remote receiving unit 241 receives a command signal, for example, a photographing command signal, from a remote controller (not shown) to input the command signal to the digital camera processor through the microcontroller.

The digital photographing apparatus may include any of the hand shake correction apparatuses according to the above-described embodiments and/or modified examples of the embodiments. Thus, decrease in clarity of images caused by shaking of the digital photographing apparatus such as hand shaking of the user can be prevented. Particularly, decrease in clarity of images that is caused during the operation of the hand shake prevention apparatus can be efficiently prevented compared to conventional hand shake prevention apparatuses.

As described above, according to the hand shake correction apparatus and the digital photographing apparatus including the hand shake correction apparatus according to the present invention, decrease in clarity of images generated when photographing images using the digital photographing apparatus can be reduced significantly.

While the present invention has been particularly shown and described with reference to exemplary embodiments thereof, it will be understood by those having ordinary skill in the art that various changes in form and details may be made therein without departing from the spirit and scope of the present invention as defined by the following claims.

What is claimed is:

1. A hand shake correction apparatus comprising:

a correction lens;

a correction lens supporting plate configured to support the correction lens, the correction lens supporting plate having two perpendicular axes of symmetry;

a base configured to support the correction lens supporting plate and to allow the correction lens supporting plate to move along a first axis that is perpendicular to an optical axis of the correction lens and along a second axis that is perpendicular to the optical axis and the first axis;

first and second driving units configured to move the correction lens supporting plate such that the correction lens supporting plate can be moved along the first axis; and third and fourth driving units configured to move the correction lens supporting plate such that the correction lens supporting plate can be moved along the second axis, wherein the first and third driving units are arranged under a first single magnet structure and the second and fourth driving units are arranged under a second single magnet structure.

2. The hand shake correction apparatus of claim 1, wherein the correction lens is disposed at the center of the correction lens supporting plate.

3. The hand shake correction apparatus of claim 1, wherein an action line of a driving force applied to the correction lens supporting plate by the first driving unit and an action line of a driving force applied to the correction lens supporting plate by the second driving unit are parallel to the first axis, respectively.

4. The hand shake correction apparatus of claim 3, wherein an action line of a driving force applied to the correction lens supporting plate by the third driving unit and an action line of a driving force applied to the correction lens supporting plate by the fourth driving unit are parallel to the second axis, respectively.

5. The hand shake correction apparatus of claim 1, wherein the first and second magnet structures are disposed in the correction lens supporting plate, and each of the first through fourth driving units comprises a coil disposed on the base.

6. The hand shake correction apparatus of claim 1, wherein the first driving unit and the third driving unit are disposed on a first side of the correction lens, and the second driving unit and the fourth driving unit are disposed on a second side of the correction lens.

7. The hand shake correction apparatus of claim 1, further comprising a cover coupled to the base to cover the correction lens support plate, wherein the cover comprises a first detecting unit configured to detect motion of the correction lens supporting plate along the first axis and a second detecting unit configured to detect motion of the correction lens supporting plate along the second axis.

8. The hand shake correction apparatus of claim 7, wherein each of the first and second detecting units comprises a hall sensor.

9. A digital photographing apparatus comprising the hand shake correction apparatus of claim 1.

10. A hand shake correction apparatus comprising:

a correction lens;

a correction lens supporting plate configured to support the correaction lens;

a base configured to support the correction lens supporting plate and to allow the correction lens supporting plate to move along a first axis that is perpendicular to an optical axis of the correction lens and along a second axis that is perpendicular to the optical axis and the first axis;

first and second driving units arranged under a first single magnet structure and configured to move the correction lens supporting plate along the first axis;

third and fourth driving units arranged under a second single magnet structure and configured to move the correction lens supporting plate along the second axis;

a yoke corresponding to each of the first and second magnet structures disposed on the base to face the corresponding magnet structure, with the yokes interposed between the correction lens supporting plate and the base, and the correction lens supporting plate is closely adhered to the base by attraction between the magnet structures and the yokes.

11. A hand shake correction apparatus comprising:

a correction lens;

a correction lens supporting plate configured to support the correction lens;

a base configured to support the correction lens supporting plate and to allow the correction lens supporting plate to move along a first axis that is perpendicular to an optical axis of the correction lens and along a second axis that is perpendicular to the optical axis and the first axis;

first and second driving units configured to move the correction lens supporting plate such that the correction lens supporting plate can be moved along the first axis;

third and fourth driving units configured to move the correction lens supporting plate such that the correction lens supporting plate can be moved along the second axis; and a cover coupled to the base to cover the correction lens support plate, wherein the cover comprises a first detecting unit configured to detect motion of the correction lens supporting plate along the first axis and a second detecting unit configured to detect motion of the correction lens supporting plate along the second axis, wherein the first and third driving units are arranged under a first single magnet structure, and wherein the second and fourth driving units are arranged under a second single magnet structure.

12. The hand shake correction apparatus of claim 11, wherein:

the first driving unit and the third driving unit are disposed on a first side of the correction lens, and the second driving unit and the fourth driving unit are disposed on a second side of the correction lens.

13. The hand shake correction apparatus of claim 12, wherein:

the first detecting unit is disposed on the first side and the second detecting unit is disposed on the second side of the correction lens, or the first detecting unit is disposed on the second side and the second detecting unit is disposed on the first side of the correction lens.

* * * * *